W. R. AHRENS.
INSTRUMENT FOR DEMONSTRATING BOYLE'S LAW.
APPLICATION FILED JUNE 26, 1916.
1,220,808.
Patented Mar. 27, 1917.
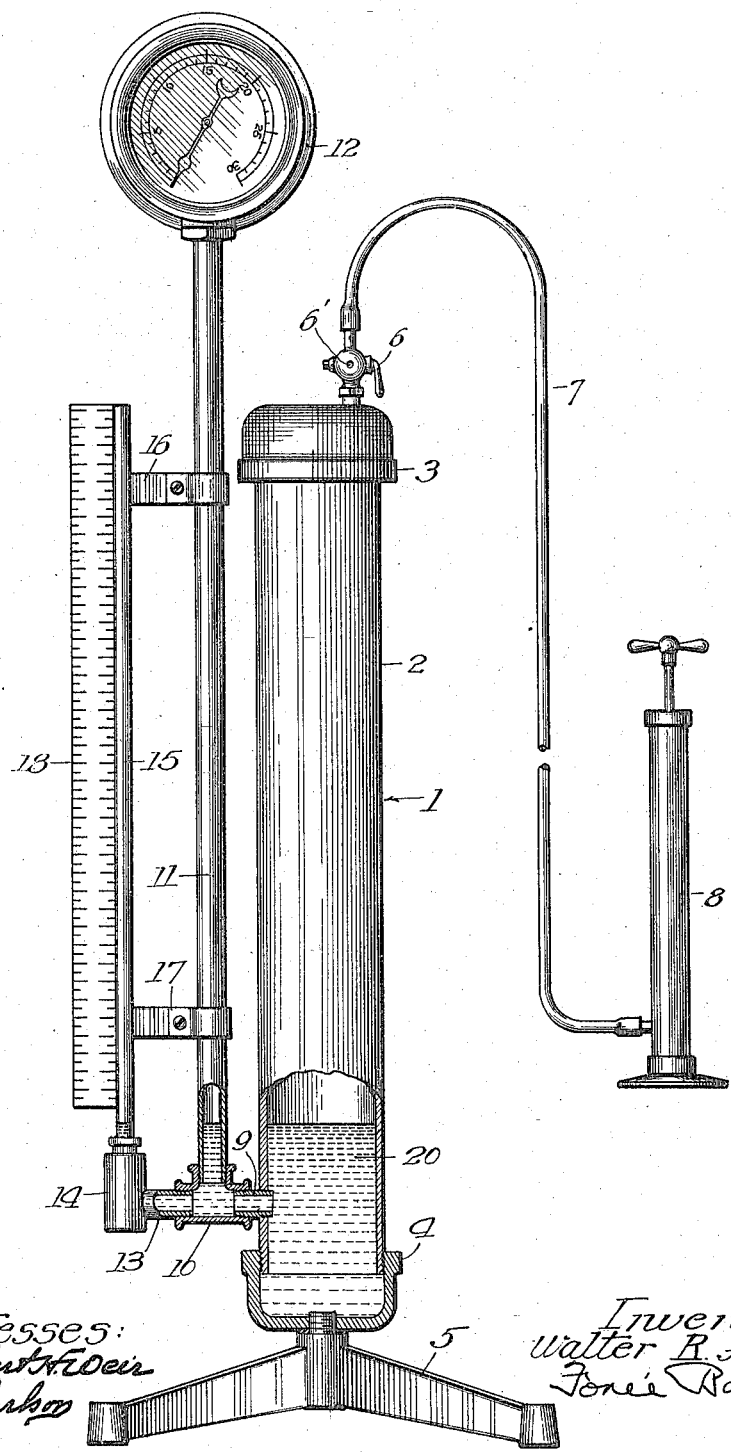

UNITED STATES PATENT OFFICE.

WALTER R. AHRENS, OF CHICAGO, ILLINOIS.

INSTRUMENT FOR DEMONSTRATING BOYLE'S LAW.

1,220,808.  Specification of Letters Patent.  Patented Mar. 27, 1917.

Application filed June 26, 1916. Serial No. 105,834.

*To all whom it may concern:*

Be it known that I, WALTER R. AHRENS, a citizen of the United States, residing at Chicago, in the county of Cook and State of Illinois, have invented certain new and useful Improvements in Instruments for Demonstrating Boyle's Law, of which the following is a specification.

My invention relates to improvements in instruments for demonstrating Boyle's law relating to the compressibility of fluids or gases, or the expansion and contraction thereof.

One of the objects of my invention is to improve instruments of this character, whereby to render them more convenient of operation, by use of a resident liquid and air under pressure; cheaper to construct and maintain by using a substitute liquid for mercury, which is available when air is employed to produce the desired pressure upon the gas volume and in the provision of direct reading means for indicating the pressure to which the gas may be subjected and similar means for indicating the change in volume of the gas.

Other and further objects of my invention will become readily apparent, to persons skilled in the art, from a consideration of the following description when taken in conjunction with the drawings.

1 is a liquid reservoir comprising a pipe 2 and the heads 3 and 4 closing the respective ends of the pipe. The base 5 is screwed into the lower head 4 for supporting the device. The head 3 is provided with a cock 6, having a vent 6', which opens the reservoir 1 to the atmosphere when the handle is turned for that purpose. To the cock there is attached a flexible rubber tube 7, communicating with an air pump 8. Near the lower end of the pipe 1, and into the pipe is inserted a nipple 9 to which is connected a threaded T 10. In the upper vertical opening of the T is screwed a tube 11 having upon its upper end a pressure gage 12. To the outer end of the T 10 is secured another nipple 13, to which is attached a fitting 14, having a vertical opening in which is secured, in proper manner, a gage glass 15, closed at its upper end, which said end is supported by an arm or bracket 16, secured to the tube 11. The bracket 17 is in like manner secured to the tube 11 and to the glass tube 15. A meter stick or volume gage 18 is arranged in parallel with the gage glass 15 and is secured in place by the brackets 16 and 17.

About three pints of suitable oil 20 is to be placed in the lower part of the reservoir 1, and the level of the oil will then be, as indicated in the drawings, in the gage glass 15, the tube 11 and the reservoir 1. To operate the device, note should be made of the height of the column of oil in the gage glass when the stop cock on the reservoir is open, to the air through the vent 6', this giving the height of oil at atmospheric pressure. This reading will be the volume of air provided it is assumed that the tube be of uniform bore.

Air is now pumped into the reservoir until the pressure gage reads nearly up to its full capacity, or until the volume of confined air, beyond the oil, is about one-third of its original volume. Now the cock 6 should be closed and note should be made of the volume of air by observing the gage stick, and the pressure reading by the gage 12. The stop cock should now be slightly opened to release a little of the air within the reservoir, again making note of the volume of air and the pressure reading. This operation should be repeated until at least ten notations have been thus obtained and recorded. These readings are upon the steps of decreasing pressure. Other readings should now be made by increasing the pressure slowly, instead of decreasing it, starting with a small gage reading, above zero. After the readings have been obtained in this manner, a curve may be plotted which will indicate the characteristic volume variation of the gas or fluid being operated upon.

Having described my invention, what I claim is:—

1. An instrument for demonstrating Boyle's law comprising a vertically positioned cylinder, caps closing the upper and lower ends of the cylinder, a standard secured to the lower cap for supporting the instrument, a vertically disposed transparent tube closed at its upper end, a connection between the lower end of said tube and the lower portion of the cylinder, a second vertical tube positioned between the first tube and cylinder, means connecting the lower end of the second mentioned tube with the aforesaid connection intermediate the transparent tube and the cylinder, a pressure gage connected to the upper end of the second mentioned tube and supported thereby, a fluid partially filling the cylinder, an air pump, and a flexible connection between said pump and the cap on the upper end of the cylinder.

2. An instrument for demonstrating Boyle's law comprising a reservoir, a standard supporting the reservoir, a vertically disposed transparent tube closed at its upper end, a connection between the lower end of said tube and the lower portion of the reservoir, a second vertical tube positioned adjacent the first tube, a connection between the lower end of the second tube and the lower portion of the reservoir, a pressure gage connected to the upper end of the second mentioned tube and supported thereby, a fluid partially filling the reservoir, an air pump, and a connection between the said pump and the upper portion of the reservoir.

In testimony whereof I hereunto set my hand in the presence of two subscribing witnesses.

WALTER R. AHRENS.

In the presence of—
ARTHUR B. RUSSELL,
MARY F. ALLEN.